United States Patent [19]

Agar

[11] 3,813,924

[45] June 4, 1974

[54] APPARATUS FOR CONTROLLING THE WITHDRAWAL FROM A CONDUIT OF THE LEADING ONE OF TWO SUCCESSIVE VOLUMES OF FLUIDS PASSING THERETHROUGH

[75] Inventor: Joram Agar, Alresford, England

[73] Assignee: Joram Agar & Company, Limited, Alresford, England

[22] Filed: Jan. 28, 1972

[21] Appl. No.: 221,609

[30] Foreign Application Priority Data
Feb. 8, 1971  Great Britain .................... 4177/71

[52] U.S. Cl. ................................................ 73/53
[51] Int. Cl. .......................................... G01n 11/00
[58] Field of Search ............. 73/53, 61.1 R, 32, 445

[56] References Cited
UNITED STATES PATENTS

| | | | |
|---|---|---|---|
| 2,654,067 | 9/1953 | Bruce | 73/53 UX |
| 2,780,094 | 2/1957 | Fink | 73/61.1 R X |
| 2,828,479 | 3/1958 | Jackson, Jr. | 73/53 UX |
| 3,453,868 | 7/1969 | Williams, Jr. | 73/32 |
| 3,483,732 | 12/1969 | Gogarty | 73/32 |
| 3,548,637 | 12/1970 | Wicks | 73/53 |
| 3,640,120 | 2/1972 | Nihof et al. | 73/53 |
| 3,661,015 | 5/1972 | Paul | 73/445 X |

FOREIGN PATENTS OR APPLICATIONS 924,896   5/1963   Great Britain .......................... 73/53

Primary Examiner—Richard C. Queisser
Assistant Examiner—Joseph W. Roskos

[57] ABSTRACT

A method of detecting substitution, at a detection position, of one fluid flowing down a conduit for another, said method including the steps of measuring a predetermined physical characteristic of fluid passing said position; deriving at successive regular intervals of time difference values representative of changes in the measured quantity occurring in each interval, said intervals being short enough to ensure that changes during one such interval in said physical characteristic due to changes in ambient conditions are negligibly small; and noting the occurrence of a difference value exceeding a predetermined amount.

12 Claims, 3 Drawing Figures

APPARATUS FOR CONTROLLING THE WITHDRAWAL FROM A CONDUIT OF THE LEADING ONE OF TWO SUCCESSIVE VOLUMES OF FLUIDS PASSING THERETHROUGH

This invention relates to methods and apparatus for detecting substitution of one fluid flowing in a conduit for another. The term fluid is used in this specification in a wide sense to include not only liquids and gases but also slurries and fluidised solid materials. Although not limitd to its application thereto, the invention is primarily intended for and of great advantage for use in fuel distribution pipeline systems for distributing such liquids as diesel fuel and petrol of different grades. In such systems one liquid may be pumped form some time along a pipe and may be followed by another so that, if one considers some particular place along a pipe — e.g. where there is a branch pipe — one liquid is substituted for another at that place, there being a liquid interface — sometimes quite clear and sharp, sometimes considerably less so — where one liquid follows another. A frequent and important requirement is that of detecting the substitution of one fluid for another — for example in order to deflect the second of two successive fluids down a branch pipe — and to detect it with certainty and precision and in a required manner having regard to the profile of the interface. Thus, for example, if jet fuel is followed by petrol it is usually a requirement to separate (by branching off) the petrol as soon as it begins to replace the jet fuel at the branching point, otherwise the petrol will produce contamination of the jet fuel. If, however, petrol follows jet fuel the opposite requirement usually arises otherwise the flash point of the jet fuel preceding the petrol may be reduced and risk of explosion result.

These and similar requirements are most difficult to satisfy. Although it is obvious enough to seek to detect the substitution of one fluid by another at a point of detection by merely measuring some physical characteristic of the fluid passing said point — for example, its density, refractive index, dielectric constant, nuclear absorption or viscosity; preferably and most conveniently its density — this does not provide a satisfactory solution of the problem. Thus the value of the physical characteristic measured — assume for the moment that this characteristic is density — of one fluid may be not much different from that of the one replacing it. Much more importantly, however, the characteristic value of each fluid is not a fixed amount but may vary, very substantially indeed, with ambient conditions, notably ambient temperature. Thus the densities of two grades of petrol at a particular temperature will differ by considerably less than the densities of one of them at two different temperatures likely to be experienced in practice so that a density meter, capable of differentiating between the two grades at a known given temperature and producing a required response when one fluid at that temperature is substitued for another at the same temperature, will produce that response if there is no substitution of liquid but only a temperature change producing a sufficient density change. If, therefore, mere measurement of a characteristic is to be relied upon for detecting substitution of one fluid for another, it is necessary either to ensure the maintenance of a constant known temperature (or whatever variable ambient conditions produce changes in the values of the physical characteristic measured) or to provide compensation for the effects of temperature (or whatever the variable embient conditions are). Neither of these expedients can, for obvious reasons, be considered a practical proposition.

The present invention seeks to avoid the foregoing difficulties and to satisfy requirements such as those hereinbefore mentioned by apparatus which is sensitive in response, reliable, comparatively simple, highly insensitive to extraneous interference or disturbance, does not require an impractically high accuray of measurement or difficult signal processing, and does not need any provision for maintaining ambient conditions constant or for providing compensation for variations of ambient conditions if they occur.

According to one aspect of this invention a method of detecting substitution, at a detection position, of one fluid flowing down a conduit for another, includes measuring a predetermined physical characteristic of fluid passing said position; to derive a value representative of the measurement; sampling said value, at successive regular intervals short enough to ensure that changes during one such interval in said physical characteristic due to changes in ambient conditions are negligibly small; and noting the occurrence of a difference value exceeding a predetermined amount between said samples and said value obtained between successive samples.

Preferably said physical characteristic is density.

According to another aspect of the invention an apparatus for detecting substitution, at a detection position, of one fluid flowing down a conduit for another, comprises a meter (preferably a density meter) positioned and arranged to measure a predetermined characteristic of fluid passing said position and to provide an output value representative thereof; means for sampling said output value at regular successive intervals of time enough to ensure that changes, during one such interval, in said physical characteristic due to changes in ambient conditions are negligibly small; and means responsive to the occurrence of a difference value exceeding a predetermined amount between said samples and said output value obtained between successive samples.

Preferably the meter is adapted to produce an output electrical wave of a frequency representative of the value of the physical characteristic measured.

In one simple embodiment of the invention the apparatus includes a digital register, a digital store, switch means constructed and arranged to feed signals from the meter to said store for short periods at the aforesaid intervals and for the remainder of the time to feed signals from the meter to said register, a digital subtractor connected and arranged to derive the difference between the information in the store and that in the register, and means responsive to th occurrence of a difference exceeding a predetermined amount.

In a preferred way of carrying out the invention the meter is adapted to produce an output electrical wave of a frequency representative of the value of the physical characteristic measured and the difference values are derived by means including a regularly re-set digital counter fed, for predetermined regularly recurrent periods, with a frequency in fixed relationship with the output frequency of the meter, a digital store to which the count in the counter is repreatedly transferred, a digital subtractor connected and arranged to produce the difference between the information in the counter and the information in the store, and means for resetting said store at regular intervals and also when said difference value exceeds a predetermined amount. Preferably said frequency in fixed relationship with the output frequency of the meter is derived by means of a substantially constant amplitude oscillator which is frequency and phase locked to the meter output frequency.

Preferably the meter output is fed as one input to a phase comparator the other input to which is provided by said oscillator, and the error signal output of said comparator is employed to vary the frequency determining effective resistance of a diode bridge included in the feedback path of the oscillator, said feed-back path also including an amplifier of automatically varying gain controller, in respect to input amplitudes thereto exceeding a predetermined amount, in dependence upon the value of said effective resistance. The said effective resistance may be controlled by applying said error signal output to the control electrode of a transistor connected between the ends of a diagonal of said bridge. The feed-back path of said oscillator preferably includes an integrator.

A preferred embodiment of the invention comprises a binary divider chain fed with a frequency equal to that produced from the meter; a counter fed with the final frequency from said divider chain through a first gate; a clocking oscillator of relatively high frequency connected to open said first gate during alternate half waves of clocking oscillations; means fed through a second gate with the final frequency from said divider chain for re-setting said counter; means actuated by the penultimate frequency produced in said divider chain for opening and closing said second gate; a first digital store; first information transfer means for transferring information in said counter to said first digital store; a digital subtractor connected and adapted to produce the difference between the information in said counter and the information in said first digital store; a second digital store; second information transfer means for transferring the difference information in said subtractor to said second digital store; a first bistable fed with the final output from said divider chain and clocked by the ante-ante-penultimate frequency occurring in said divider chain; a second bistable fed with output from said first bistable and clocked simultaneously with the first bistable; a third gate for feeding output from the first bistable means to the first information transfer means to provide the same with a transfer command; a timer giving a predetermined time interval and connected to be reset by output from said third gate; means for opening said third gate when either (a) a timing signal is present from the timer or (b) the most dignificant digits in the subtractor output and in the second store are different; and means for providing the second information transfer means with transfer commands from the output of the second bistable.

An apparatus in accordance with this invention preferably includes means for producing an analog signal of amplitude representative of the difference value and means responsive to the occurrence of an amplitude of predetermined amount.

Preferably there are provided means, actuated upon response of said apparatus to the substitution of one fluid for another for actuating one or more valves in the conduit system in which the fluid flows and/or for actuating an indicator or alarm.

The invention is illustrated in and further explained in connection with the accompanying drawings, in which.

Figure 1:
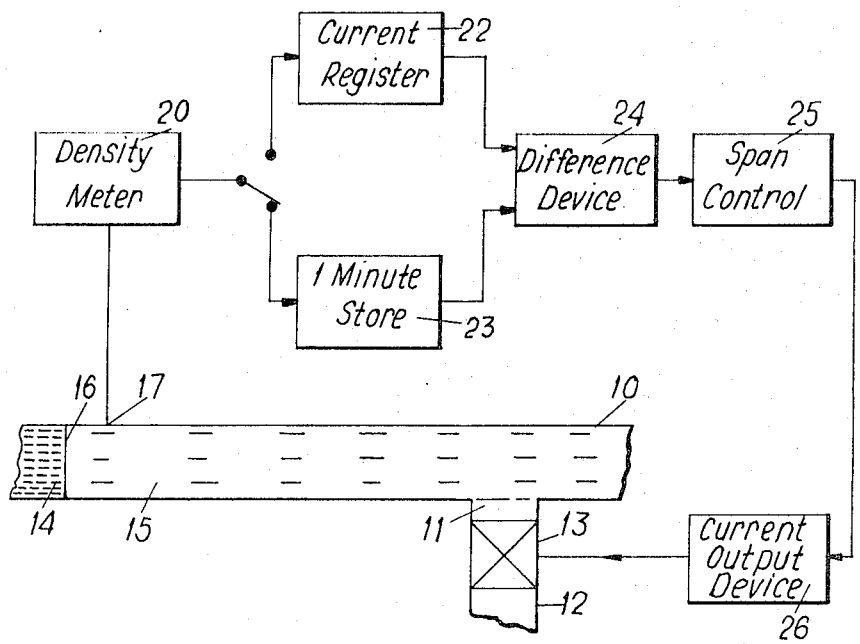
FIG. 1 is a block diagram of one simple form of embodiment of the invention.

In FIG. 1 there is shown a pipeline 10 which communicates, at a liquid withdrawal zone 11, with a branch line 12, flow through the latter being controlled by a valve 13. Two successive volumes of different liquids 14, 15 having a common interface 16, are shown as passing through the pipeline 10, the interface 16 being shown as approaching a density measurement region 17. In FIG. 1 the interface is represented for convenience of drawing, as planar and perpendicular to the direction of flow (which is from left to right as seen in FIG. 1) though naturally in practice such a planar separating interface between the liquids would probably not occur. The liquids 14, 15 may, for example be medium and high grade petrols respectively each of whose densities thus varies uniquely with temperature. The lighter product will, however, always be lighter at the same temperature.

Figure 2:
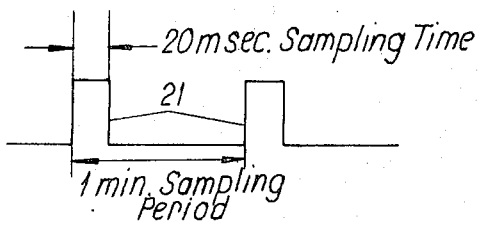
FIG. 2 is a graphical figure representative of signals occurring in the apparatus of FIG. 1, and FIG. 3 diagrammatically represents, in some detail, a preferred embodiment of the invention.

A density meter 20, e.g., that disclosed in British Pat. Specification No. 1,175,586, produces signals 21 (FIG. 2) which are indicative of the density of the liquid instantaneously passing through the region 17, the latter being disposed upstream of the withdrawal zone 11. As will be seen from a reading of the said Specification No. 1,175,586, the output frequency from the density meter depends upon the density, increasing with decrease in density and vice versa.

Signals 21 from the meter 20 are passed to a digital store 23 at regular intervals which are short enough to ensure that density changes due to such causes as temperature changes cannot in practice occur during the length of an interval. Thus the signals 21 may be passed to the store at intervals of, say, one minute and for periods of 20 milliseconds. One minute intervals are of more than adequate shortness for successive signals not to need temperature comepnsation since no material difference in temperature of the liquids 14, 15 can occur in so short a time. Indeed no substantial difference in temperature could occur in practice in a time considerably longer than this, e.g., in a time of a quarter of an hour or thereabouts. The meter 20 is also connected, except during the 20 millisecond periods, (the above example of 1 minute intervals and 20 millisecond periods is here assumed) to a register 22.

The register 22, which thus registers signals indicative of the present density of the liquid passing through the region 17, and store 23, which thus registers the density of the liquid which passed through the region 17, 1 minute previously, are connected to a difference device 24 which employs one or more binary circuits and in which these signals are subtracted from each other. The resulting signal is passed to a span control 25 where, if it exceeds a reference signal with which it is compared, it passes to a current output device 26. The latter then produces an output which automatically closes the valve 13 immediately all the liquid 15 have been fully withdrawn through the liquid withdrawal zone 11. Alternatively, and/or additionally, the output from the current output device 26 may be used to operate an alarm.

The output from the difference device 24 may be in the form of a string of pulses, or in the form of a voltage or a current proportional to the measured difference.

The apparatus shown in the drawings may be used to measure very small changes of density, e.g., of 10g/1 or less, while still maintaining a very high level of accuracy, e.g., to within 0.1 percent of 10g/1.

Figure 3:
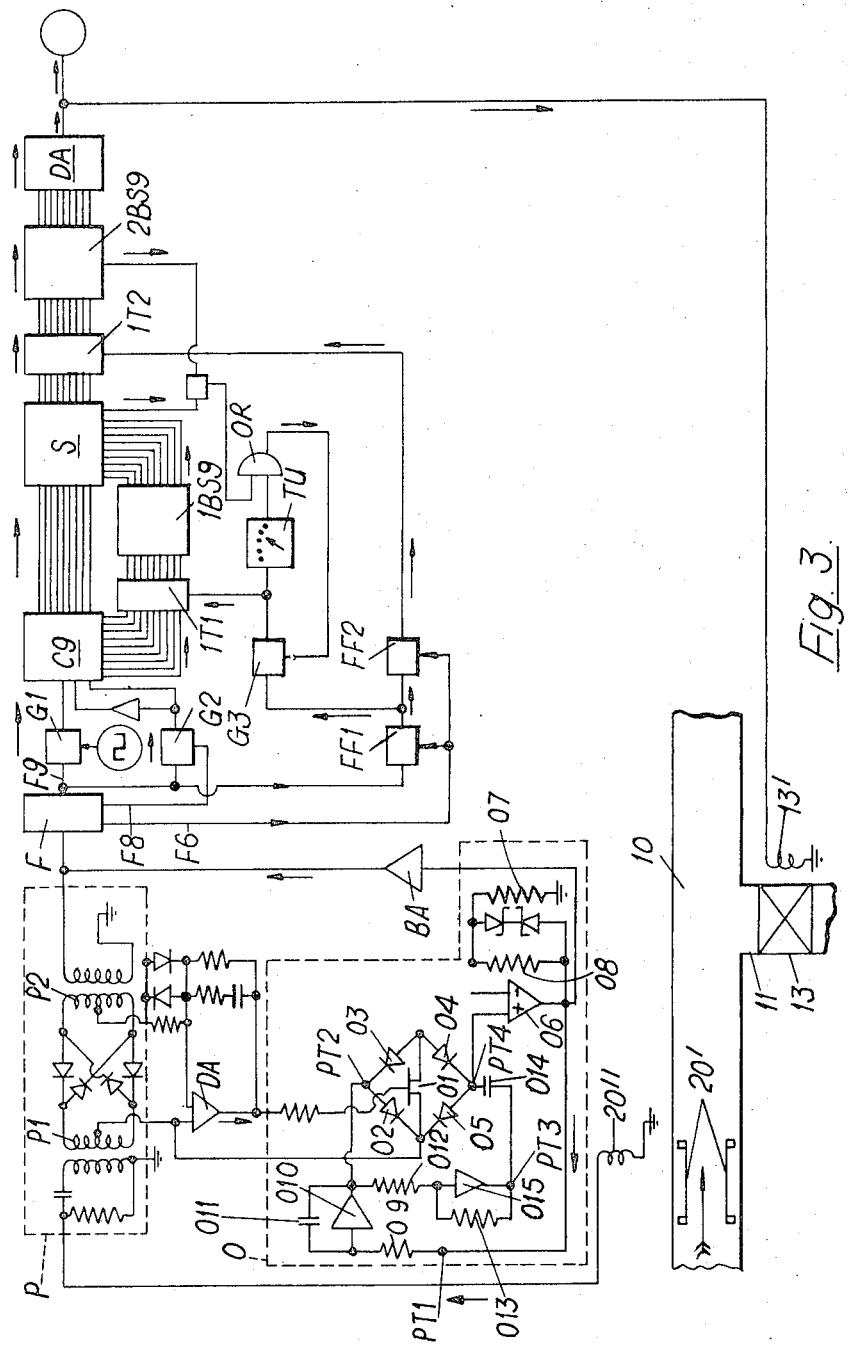

In FIG. 3, which illustrates a preferred embodiment, th pipe line, branch line and control valve are again referenced 10, 11 and 13 respectively, the value being here represented as electro-magentically controlled by a coil 13'. The density meter is again a meter as described in Britich Pat. No. 1,175,586 and includes a thin cylinder 20' which is set in resonant circumferential oscillation by an electro-magentic field, the oscillations giving rise to an induced output voltage, at a frequency $f$ which is related to the density, in a pick-up coil 20''. It is the output from this coil which constitutes the density representative output from the meter. To quote practical figures by way of example the value of $f$ dependent on density, might extend over the (approximate) range of 5kc/s to 2.5 kc/s, decreasing with increase in density.

The output frequency $f$ from the density meter, after any amplification (not shown) which may be required, is fed as one input to a phase comparator P, of form knwon per se, and shown within the interrupted outline so referenced. This input is applied from the centre tapped input transformer secondary P1. The second input is provided through a buffer amplifier BA, from an oscillator 0 which is shown within the interrupted outline so referenced. This second input is applied from the center-tapped input transformer secondary P2. As will be explained later, the whole arrangement is such that there appears, at the output of the buffer amplifier BA, a substantially constant amplitude oscillation of frequency $f$ entrained with and phase locked to the output of the density meter. So long as the two inputs to the phase comparator P are of the same frequency and in phase there will be no voltage difference between the two transformer seondary centre traps. If, however, a phase difference occurs between the two inputs, a voltage difference representative in sense and magnitude of the sense and magnitude, respectively, of said phase difference will occur between the centre traps. This voltage difference is an error voltage which is employed automatically to control the phase and frequency of the oscillator 0 in such a manner, now to be described, that the output from the amplifier BA is maintained locked in phase with the density meter output.

More in detail, the centre tap on the secondary P1 supplies one input to a differential amplifier DA the second input of which is supplied through a resistance shunted by two oppositely sensed diodes in parallel from the centre tap on the secondary P2. Across the amplifier DA are two parallel paths one consisting of a resistance and the other of a resistance in series with a capacitor. The amplifier DA with its above-described and illustrated circuitry constitutes a DC amplifier and low pass filter and the output therefrom is fed through a series resistance to the gate electrode of a field effect transistor (FET) 01 connected between the opposite ends of one diagonal of a rectifier bridge comprising four diodes 02, 03, 04, 05 connected and sensed as shown. As will be seen the FET o1 is connected between the junction point of the diodes 02 and 05 and the junction point of the diodes 03 and 04. The centre tap on the secondary P1 is also connected to the former of these two junction points. The junction point of the diodes 04 and 05 is connected to the positive input terminal of a further amplifier 06 the negative input terminal of which is earthed through a resistance 07. Across the further amplifier 06 are two paths in parallel, one consisting of a resistance 08 and the other consisting of two oppositely sensed Zener diodes in series. If the value of resistance 07 is R that of resistance 08 is (in the particular example now being described) 100R. The feedback path of the oscillator 0 is completed from the output of the amplifier 06 (which output is also supplied through the buffer amplifier BA as the second input to the phase comparator P) through a resistance 09 also the value R and an amplifier 010 shunted by a capacitor 011 to the junction point of the diodes 02 and 03. A circuit comprising a resistance 012 also of value R, in series with a further resistance 013, also of the same value R, and a capacitor 014, connects the output side of the amplifier 010 with the junction point of the diodes 04 and 05, the resistance 013 being connected across an inverter 015.

For convenience of explanation four points, referenced PT1, PT2, PT3 and PT4 are marked in the circuit. AS will be apparent, the diode bridge presents, between the points PT2 and PT4, a resistance the value of which is controlled by the voltage applied to the gate of the FET 01. Call this value R1. It determines, in accordance with well-known principles, the frequency of oscillation. The combination of amplifier 010 with its parallel capacitor 011 constitutes an integrator the output from which will lag by 90° in phase behind the input thereto. If the voltage at point PT1 is V that at point PT2 will be the integral of $Vdt$ and that at point PT3 will be the integral of $+ Vdt$. Call the voltage between the points PT2 and PT4 $V_{R1}$ and that across the capacitor 014 $V_{C2}$, C2 being the value of this capacitor 014. When R1 is high $V_{R1}$ will be low relative to $V_{C2}$. The voltage between points PT2 and PT3 will be $V_{R1} + V_{C2}$ and as will be apparent, $V_{R1}$ will always be in phase quadranture with $V_{C2}$.

As already stated the voltage at point PT4 is fed as input to the amplifier 06. So long as this input voltage does not exceed the Zener voltage of one of the two Zener diodes (which are alike) neither will conduct and the gain of the amplifier 06 (assuming rectilinearity and the use of resistances of the relative values stated) will be 100. If, however, the input amplitude exceeds the Zener voltage, one of the Zener diodes will conduct on one half wave and the other will conduct on the other and the gain will drop. In this way the gain is made automatically variable, falling with increase in amplitude at point PT4, as soon as said amplitude reaches a predetermined value determined by the Zener voltage and if $a$ is the gain $aR$ is maintained automatically equal to R1, the effective resistance between points PT2 and PT4. The combination of phase comparator P and oscillator 0 thus procuces, at the input and therefore the output of the buffer amplifier BA, a substantially constant amplitude oscillation of frequency $f$ phase locked to the output of the density meter. This output is fed to a binary frequency divider chain F.

In the particular example now being described the divider chain F provides an overall division ratio of $2^9$ providing an output frequency of $f/2^9$ on the lead referenced F9. Two other outputs, of frequencies $f/2^8$ and $f/2^6$ are taken from intermediate points on the divider chain F and appear on the leads referenced F8 and F6 respectively. The output on F9 is fed through a gate G1, when open, to a 9 bit counter C9. The gate G1 is controlled by a square wave crystal oscillator XO which acts as a clocking oscillator and has a frequency, in the present example, of 2 Mc/S. It is arranged in known manner to open the gate G1 on alternate half waves of its output and to close it on the other alternate half waves. Re-setting of the counter C9 is effected through a gate G2 which receives input at the frequency $f/2^9$ from lead F9 and is gated by the signal of frequency $f/2^8$ from the lead F8. Re-setting pulses for the counter C9 are supplied from the gate G2 (when open) directly and through an inverter IN and effect re-setting in accordance with well known counter practice.

Information in the counter C9 is supplied continuously to one input of a subtractor S of any suitable construction known per se and the second input to which is supplied from a 9 bit binary store 1BS9. Information in the counter C9 is also supplied to the store 1BS9 when on information transfer control unit 1T1, also of known construction receives a transfer command so that it is "open." The method of control of this transfer control unit 1T1 will now be described.

Output of frequency $f/2^9$ taken from lead F9 is fed to a first flip-flop FF1 which feeds into a further gate G3 and also into a second flip-flop FF2. These flip-flops are caused to change state together by a clocking input of frequency $f/2^6$ supplied over the lead $F_6$. The output from the gate G3 is fed as control input to the transfer control unit 1T1 and is also used to reset a timer TU. This timer, which may for example be a monostable, or a relaxation circuit, is designed to produce a timing signal at regular intervals, e.g., at intervals of 1 minute. It is convenient to construct the timer TU, in manner known per se, so that it can produce timing signals at any of a plurality of selectable intervals in dependence upon the setting of a manual control for selecting different values of resistance and/or capacity in the circuitry of the timer. This is indicated conventionally in the figure by a handle capable of being manually set to any of a plurality of positions. The selectable intervals may conveniently be in binary relationship, e.g., intervals of 30 seconds, 1 minute, 2 minutes, 4 minutes, 8 minutes, and 16 minutes, may be selectable. Output from the timer is fed as one input to an exclusive — OR gate referenced OR the output of which is used as control input to open the gate G3 so that, if output is present from the exclusive OR gate, the gate G3 is opened. Such output will be present from the exclusive -OR gate if it receives an input from the timer TU of if it receives on its second input terminal, what may be termed a "saturation" input. The manner in which this saturation input is obtained will be described later.

Output information from the subtractor S is fed to a second 9 bit store 2BS9 through a second information transfer control unit 1T2 when in the "open" state. The state of this control unit is controlled by the output from the second flip-flop FF2.

The above-mentioned saturation input to the exclusive -OR gate is provided by a known comparator device PS which receives inputs from suitable points in the subtractor S and from the store 2BS9 and is arranged, in known manner, to send a saturation input pulse to the second input of the exclusive -OR gate if the most significant digit in the difference output from the subtractor S differs from the most significant digit in the information in the store 2BS9.

Although, for convenience in explanation and drawing, the transfer control units are shown as separate units their functions could, of course, be performed in each case by equivalent control circuitry in one of the two units (C9 and S in one case; S and 2 BS9 in the other) information transfer control between which is to be controlled.

Information in the store 2 BS9 may be utilised in any convenient manner to produce a desired control action, e.g., to operate an alarm or an indicator and/or to actuate one or more pipe valves when that information exceeds a predetermined amount or count. As shown the information in the store is fed to a digital-analog converter DA of any convenient known form and which includes, on its output side, a fixed level comparator. If the analog signal resulting from conversion of the digital input to DA exceeds the predetermined fixed level (which may be adjustable) the converter DA provides an output which actuates an alarm or indicator A and operates a valve 13 controlling liquid entry into the branch pipe 11.

The operation of the whole arrangement may be described in general terms as follows:

The input to the divider chain F is a substantially constant oscillation phase-locked to the frequency $f$ from the density meter. Constancy of amplitude has the great practical advantage that the oscillation is highly suitable for the subsequent digital processing so that high reliability with minimum liability to erroneous processing are obtained.

The divider chain F provides three outputs namely (in the particular example described) $f/2^9$, $f/2^8$ and $f/2^6$. The $f/2^9$ output is passed through gate G1, which is opened during alternate half-cycles from the square wave clocking oscillator XO, to the counter C9. All the stages of this counter are re-set by the gate G2 which takes its input from the $f/2^9$ output of the divider chain F and is gated by the $f/2^8$ output therefrom.

Information in the counter C9 is fed continuously to one input of the subtractor S and is also transferred to the store 1 BS9 when a transfer command is fed to the transfer control unit 1T1 from the gate G3. Thi gate is opened when a signal is present at either of the inputs of the exclusive -OR gate OR. When open is passes a signal from the flip-flop FF1 the state of which is changed by the $f/2^6$ output from the divider chain F and the input to which is constituted by the $f/2^9$ output from the divider chain F.

When the gate G3 is opened and the transfer command signal is passed to the unit 1T1 a signal is also passed to re-set the timer TU the output from which constitutes one input to the exclusive -OR gate.

The second input to the subtractor S is provided from the store 1 BS9 and the said subtractor S produces a 9 bit output equal to the difference between its two inputs. This difference is fed, when a transfer command signal is fed to the unit 1T2, to the second 9 bit store 2 BS9. The transfer command for the unit 1T2, is supplied by the second flip-flop FF2 the state of which is changed simultaneously with that of the flip-flop FF1 by the $f/2^6$ output from the divider chain F and which also receives the $f/2^9$ output from the flip-flop FF1.

Outputs dependent on the information in the first stages of the subtractor S and of the store 2BS9 are used in combination to provide the second input to the exclusive -OR gate which receives said second input, from comparator device PS, if the most significant digits in S and 2 BS9 differ.

Consider the periods of the frequency $f/2^9$. The counter C9 will count during the first half of each such period. At a time $t_1$ at the end of the first quarter of the next half period the count in counter C9 will be transferred to the store 1 BS9 if the gate G3 is opened (that is to say if the most significant digits in the subtraction difference at S and in the store 2 BS9 are different or if a signal is present from the timer TU. At a time $t_2$ at the end of the next quarter of said next half period the difference count in the subtractor is transferred to the store 2BS9. Over the remainder of the said next half perid the counter C9 is re-set.

The embodiment of FIG. 3 has many important advantages, chief of which is that it will respond (e.g., perform a required control action such as actuating an indicator and/or controlling one or more pipe valves) only if one fluid passing the density meter is replaced by another and is practically immune from responding to changes in fluid density due to other causes. Thus it will not respond to changes in fluid density caused by temperature variations because such changes occur too slowly to produce any appreciable difference between two successively utilised samples of the density-representative frequency $f$. In this connection it should be noted that whether or not an arrangement in accordance with this invention produces a response is dependent solely on the difference between the successively utilised samples of the density-representative frequency $f$ and not upon the length of the time interval between these samples. An arrangement in accordance with this invention is therefore not one which measures rate of change of density (or other physical characteristc) or is dependent for its response upon such rate of change. The invention therefore avoids all the defects and difficulties — notably the liability to false response, the dependence upon easily disturbed, sensitive measuring apparatus of undesirably high necessary accuracy, and the general unrealiability — of known apparatus dependent upon rate of change measurement.

An apparatus as described with reference to FIG. 3 is also practically immune to short lived rapid changes in fluid density due to such causes as air bubbles and like turbulence effects in a body of the said fluid passing the density meter. Such changes may be lumped together under the term "noise." Such immunity to noise is obtained because of the inclusion of the integrator (amplifier 010 and capacity 011) in the feedback path of the oscillator 0. Noise effects are too rapid for changes in the output frequency of the meter due to noise effects to be followed by changes in the frequency $f$ fed to the divider chain $f$.

Finally the use of a meter providing its output in the form of a changing frequency in combination with digital processing by means including simple gates, counters, stores and the like, enables the actual circuitry employed — and in particular the divider chain, counter, stores, transfer control units and gates — to be embodied in an integrated circuit structure of relatively low cost, small size, low power consumption, very high reliability and reproducability in manufacture.

I claim:

1. Apparatus for detecting a substitution, at a detection position, of one fluid flowing down a conduit for another, said apparatus comprising:
   a meter positioned and arranged to measure a predetermined physical characteristic of fluid passing said position and to provide an output valve representative thereof;
   means for sampling said output value at successive regular intervals to obtain samples of said output value at said successive regular intervals, said intervals being short enough to insure that changes in said measured physical characteristic during one interval due to changes in ambient conditions are negligibly small,
   means for holding the output value of one sample until the next successive sampling of the output value,
   means for deriving differences in output values between said one sample of the held output value and the next successive sample of the output value representative of changes in the measured characteristic of the fluid during the interval between said samples, and
   means responsive to the occurrence of a derived difference exceeding a predetermined amount in said output values between said one sample and said next successive sample.

2. Apparatus as claimed in claim 1 wherein the meter is a density meter.

3. Apparatus as claimed in claim 1 wherein the meter is adapted to produce an output electrical wave of a frequency representative of the value of the physical characteristic measured.

4. Apparatus as claimed in claim 1 and wherein the meter is adapted to produce an output electrical wave of frequency representative of the value of the physical quantity measured and wherein there is provided a digital register, a digital store, switch means constructed and arranged to feed signals from the meter to said store for short periods at the aforesaid intervals and for the remainder of the time to feed signals from the meter to said register, a digital subtractor connected and arranged to derive the difference between the information in the store and that in the register, and means responsive to the occurrence of a difference exceeding a predetermined amount.

5. Apparatus as claimed in claim 1 wherein the meter is adapted to produce an output electrical wave of a frequency representative of the value of the physical characteristic measured and the difference values are derived by means including a regularly re-set digital counter fed, for predetermined regularly recurrent periods, with a frequency in fixed relationship with the output frequency of the meter, a digital store to which the count in the counter is repeatedly transferred, a digital subtractor connected and arranged to produce the difference between the information in the counter and the information in the store, and means for resetting said store at regular intervals and also when said difference value exceeds a predetermined amount.

6. Apparatus as claimed in claim 5 wherein said frequency in fixed relationship with the output frequency of the meter is derived by means of a substantially constant amplitude oscillator which is frequency and phase locked to the meter output frequency.

7. Apparatus as claimed in claim 5 wherein said frequency in fixed relationship with the output frequency of the meter is derived by means of a substantially constant amplitude oscillator which is frequency and phase locked to the meter output frequency; said meter output frequency is fed as one input to a phase comparator the other input to which is provided by said oscillator; and the error signal output of said comparator is employed to vary the frequency determining effective resistance of a diode bridge included in the feed-back path of the oscillator, said feedback path also including an amplifier of automatically varying gain controlled, in respect of input amplitudes thereto exceeding a predetermined amount, in dependence upon the value of said effective resistance.

8. Apparatus as claimed in claim 5 wherein said frequency in fixed relationship with the output frequency of the meter is derived by means of a substantially constant amplitude oscillator which is frequency and phase locked to the meter output frequency; said meter output frequency is fed as one input to a phase comparator the other input to which is provided by said oscillator; and the error signal output of said comparator is employed to vary the frequency determining effective resistance of a diode bridge included in the feed-back path of the oscillator, said feed-back path also including an amplifier of automatically varying gain controlled, in respect of input amplitudes thereto exceeding a predetermined amount, in dependence upon the value of said effective resistance and said effective resistance being controlled by applying said error signal output to the control electrode of a transistor connected between the ends of a diagonal of said bridge.

9. Apparatus as claimed in claim 5 wherein said frequency in fixed relationship with the output frequency of the meter is derived by means of a substantially constant amplitude oscillator which is frequency and phase locked to the meter output frequency; said meter output frequency is fed as one input to a phase comparator the other input to which is provided by said oscillator; and the error signal output of said comparator is employed to vary the frequency determining effective resistance of a diode bridge included in the feed-back path of the oscillator, said feed-back path also including an amplifier of automatically varying gain controlled, in respect to input amplitudes thereto exceeding a predetermined amount, in dependence upon the value of said effective resistance, said feed-back path also including an integrator and said effective resistance being controlled by applying said error signal output to the control electrode of a transistor connected between the ends of a diagonal of said bridge.

10. Apparatus as claimed in claim 5 and comprising a binary divider chain fed with a frequency equal to that produced from the meter; a counter fed with the final frequency from said divider chain through a first gate; a clocking oscillator of relatively high frequency connected to open said first gate during alternate half waves of clocking oscillations; means fed through a second gate with the final frequency from said divider chain for re-setting said counter; means actuated by the penultimate frequency produced in said divider chain for opening and closing said second gate; a first digital store; first information transfer means for transferring information in said counter to said first digital store; a digital subtractor connected and adapted to produce the difference between the information in said counter and the information in said first digital store; a second digital store; second information transfer means for transferring the difference information in said subtractor to said second digital store; a first bistable fed with the final output from said divider chain and clocked by the ante-ante-penultimate frequency occurring in said divider chain; a second bistable fed with output from the first bistable and clocked simultaneously with the first bistable; a third gate for feeding output from the first bistable means to the first information transfer means to provide the same with a transfer command; a timer giving a predetermined time interval and connected to be reset by output from said third gate; means for opening said third gate when a timing signal is present from the timer or the most significant digits in the subtractor output and in the second store are different; and means for providing the second information transfer means with transfer commands from the output of the second bistable.

11. Apparatus as claimed in claim 1 and comprising means for producing an analog signal of amplitude representative of a digital difference between two successively produced values representative of measurements obtained at successive intervals of time.

12. Apparatus as claimed in claim 1 and comprising means, actuated upon response of said apparatus to the substitution of one fluid for another for actuating one or more valves in the conduit system in which the fluid flows.

* * * * *